US008243305B2

(12) United States Patent
Jang et al.

(10) Patent No.: US 8,243,305 B2
(45) Date of Patent: Aug. 14, 2012

(54) PRODUCTION PRINT CAPACITY DISPLAY FOR PROCESS OPTIMIZATION

(75) Inventors: William Jang, Hawthorne, CA (US); Andrew Scott McVey, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1292 days.

(21) Appl. No.: 11/789,002

(22) Filed: Apr. 20, 2007

(65) Prior Publication Data

US 2008/0259381 A1 Oct. 23, 2008

(51) Int. Cl.
*G06F 15/00* (2006.01)
*G06K 1/00* (2006.01)

(52) U.S. Cl. .......................... 358/1.15; 358/1.1; 358/1.9

(58) Field of Classification Search ................... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

2007/0199069 A1* 8/2007 Ohtake et al. .................. 726/20
2007/0257954 A1* 11/2007 Nishizaka et al. .............. 347/14
2008/0260281 A1* 10/2008 Fritz et al. ..................... 382/254

* cited by examiner

*Primary Examiner* — Thierry Pham
(74) *Attorney, Agent, or Firm* — Kermit D. Lopez; Luis M. Ortiz; Melissa Asfahani

(57) ABSTRACT

A system automatically processes current capacity and optimal capacity for at least one printing system for use in deterring current billing, optimal billing and operating cost. A data-processing apparatus (CPU) associated with a printer and an optimization module operable together to optimize current capacity and optimal capacity, and determine current billing, optimal billing and operating cost information. Information is optimized for use at a client (local or remote) and for display in a single graphical user interface. Data is used to optimize print system usage.

17 Claims, 4 Drawing Sheets

PRODUCTION PRINT CAPACITY DISPLAY FOR PROCESS OPTIMIZATION

TECHNICAL FIELD

Embodiments are generally related to data-processing methods and systems. Embodiments are also related to the field of displaying capacity utilization in a print shop via a graphical user interface. Embodiments are additionally related to a production printing capacity display for process optimization.

BACKGROUND OF THE INVENTION

The costs for operating a print shop are generally categorized as the capitalization cost of the printing equipment, and the operating and employment costs for running the equipment. As print shops tend to transform from being lithographic to digital, additional equipment costs will be incurred so that "how" print shop facilities are managed becomes even more important to achieve desirable and more profitable operating results.

The scheduling and flow of jobs through print shops today is typically controlled by preset, often manual, scheduling policies and workflows that take into consideration only the overall equipment, physical layout and labor in the shop. Workflow is typically fixed in a departmental framework. Emphasis is given to keeping all the equipment busy, with the consequence that a lot of work in progress is generated, jobs are often late, error rates are large, and the exact status of specific jobs in progress in the shop is generally not known. Therefore, the productivity of the vast majority of print shops is far from optimal or that can be realized using modern control theory methods to adjust the scheduling, labor, and workflow to respond to both changes in the incoming job flow and to the state of the shop when the jobs are arriving.

Many print shops do acquire some data on equipment utilization, labor utilization, and percent of jobs completed on-time that are used as average characterizations of shop performance. Almost all print shops collect data for billing and evaluation of on-time delivery of jobs; however, the global nature of this data limits its ability to assist the print shop owner in making value added changes to the workflow through the print shop. The print shop owner/operator typically uses this limited data in an ad hoc manner to make empirical adjustments in global shop policies based on heuristics that make sense to the local print shop owner/operator. As a result, print shop owners/operators rarely know just how their shops are performing.

Production printing software such as FreeFlow DocuSP, Output Manager and Process Manager provided by Xerox Corporation all provide print shops with the ability to create printed output and in some ways provide the means of optimizing the overall printing operation of the print shop. They do not, however, provide sufficient information to allow for optimization.

It is believed that a need exists for a unique combination of data gathering through one or more algorithms for simplified display in an interface through which print shop owners/operators can quickly assess printer usage and volume information combined with cost and price information that can enable the owner/operator to optimize the print shop both from a print capacity standpoint and from a cost and price perspective.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved system for automatically processing print shop equipment capacity utilization data for display via a graphical user interface.

It is another aspect of the present invention to provide for an improved method of automatically processing print shop equipment capacity utilization data for display via a graphical user interface.

The aforementioned aspects and other objectives and advantages can now be achieved as described herein. The invention works by processing data automatically to allow print shop managers to compare optimal versus current capacity of all printers within their shop on the basis of percent to capacity and based on their cost of operation and billing rate, on a per page basis. The purpose of the data comparison is to allow print shop managers to optimize the print capacity on one or more printers based either on the number of prints or on the basis of the billing rate to the end user or on the basis of cost.

A capacity checking software operating within a print shop enterprise system, or on individual machines for retrieval from a computer, operates to automatically process user cost and pricing information and graphically display the data to a user. The software can provide a print shop manager with the ability to determine the relative monochrome and color print capacity of all printers in a shop both graphically and in percentage of total, the currently used monochrome and color capacity for each printer both graphically and in percentage of total, and the current billing on a per printer basis as well as the optimal billing for that printer.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples are merely provided for the purpose of illustrating at least one embodiment of the invention and are not intended to limit the scope and application of the appended claims. It should be appreciated by the skilled in the art that various presently unforeseen or unanticipated alternatives, modifications, variations or improvements can be made while still remaining within the scope and spirit of the appended claims.

Figure 1:
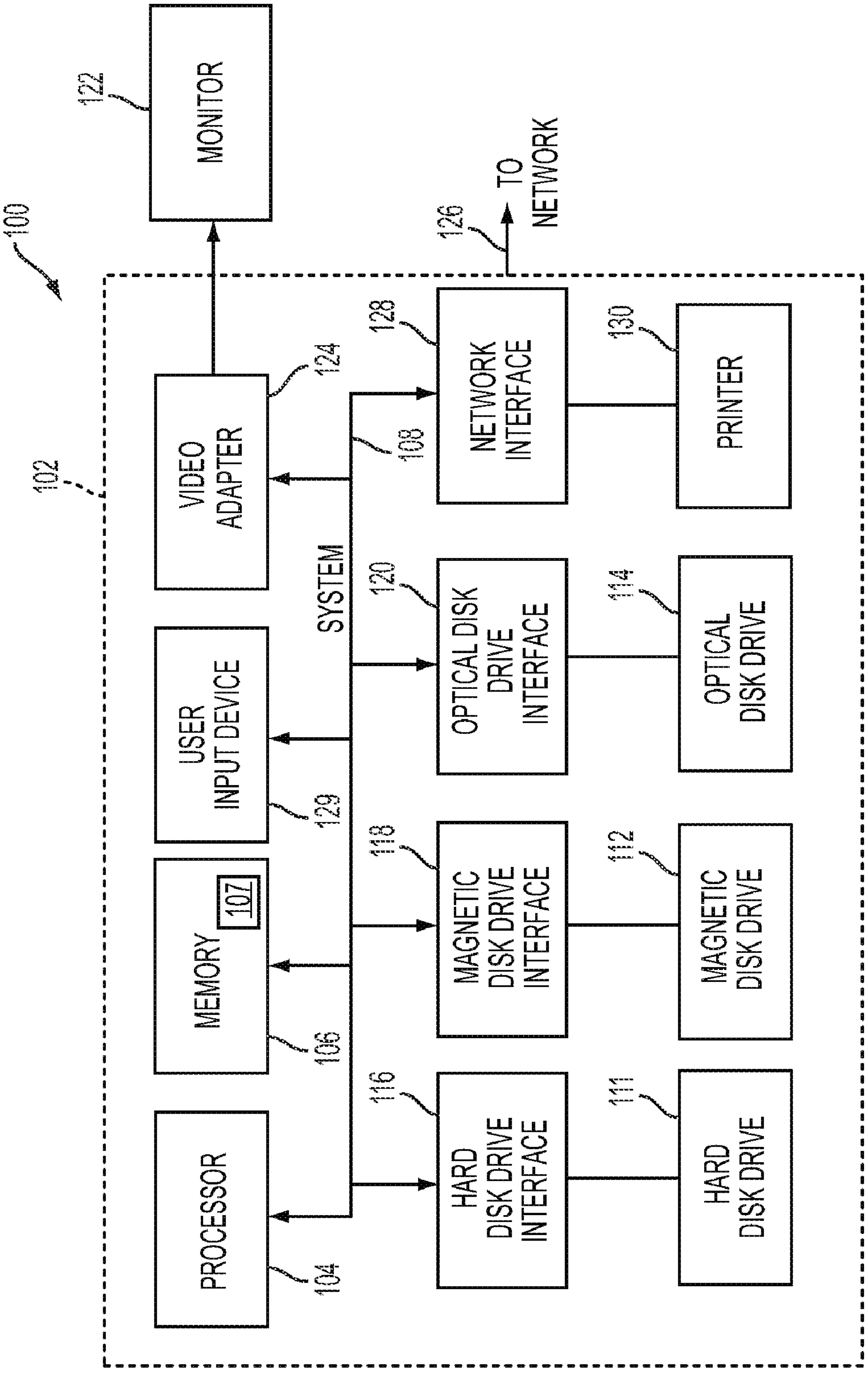
FIG. 1 illustrates a block diagram of a data-processing apparatus that can be utilized to implement production print capacity display for optimization in accordance with a preferred embodiment.

FIG. 1 illustrates a block diagram of a printing system 100, which can be utilized to implement a preferred embodiment. A printing system 100 can be used to optimizing the overall printing system operations of an enterprise such as a print shop, as will be described in greater detail herein. Printing system 100 can be configured to include various modules single housing 102. The printing system 100 includes access to random access memory 106 and other modules via a system bus 108 that can operatively couple various system components to a central processing unit 102. One or more central processing units 102 can operate as either a single central processing unit or a parallel processing environment. Printing system 100 represents only one of many possible printing systems that can be used for implementing features of the invention. Printing system 100 can be provided as a standalone system or operate in cooperation with a standing computer, server, portable/laptop computer, PDA (personal digital assistant), and so forth. When operable as a stand-alone device, the printing system 100 includes a user input device 129 and an image monitor 122. The printing system can include network access 126 via network interface 128.

The printing system 100 can include one or more data storage devices for storing programs and other data. Examples of such data storage devices can include a hard disk drive 111 for reading from and writing to a hard disk (not shown), a magnetic disk drive 112 for reading from or writing to a removable magnetic disk (not shown), and an optical disc drive 114 for reading from or writing to a removable optical disc (not shown), such as a CD-ROM or other optical medium. The image monitor 122 can be organic to or connected with the printing system 100 through a video adapter 124 or other interface. Additionally, the printing system 100 will include other modules and hardware necessary to process documents for printing, such as print engines, image capturing devices, etc., which are represented in the figure by printer module 130.

When used, the hard disk drive 111, magnetic disk drive 112, and/or optical disc drive 114 are connected to the system bus 108 by a hard disk drive interface 116, a magnetic disk drive interface 118, and an optical disc drive interface 120, respectively. These drives and their associated computer-readable media provide nonvolatile storage of computer-readable instructions, data structures, program modules, and other data for use by the computer system 100. Process optimization software 107 in accordance with implementing the process optimization features of the present invention can be stored, accessed and operated in cooperation with these memory devices and the processor 104. Memory 106 would also be integral to enabling process optimization software module 107 to the extent it functions as RAM, Note that such computer-readable instructions, data structures, program modules, and other data can be implemented as a module or group of modules, such as, for example, process optimization software module 107, which can be stored into memory 106 during operation.

Note that the embodiments disclosed herein can be implemented in the context of a host operating system and one or more software modules, such as process optimization software module 107. In the computer programming arts, a software module can be typically implemented as a collection of routines and/or data structures that perform particular tasks or implement a particular abstract data type.

Software modules generally comprise instruction media storable within a memory 106 and operable in cooperation with a processor 104, and are typically composed of two parts. First, a software module may list the constants, data types, variable, routines and the like that can be accessed by other modules or routines. Second, a software module can be configured as an implementation, which can be private (i.e., accessible perhaps any to the module), and that contains the source code that actually implements the routines or subroutines upon which the module is based. The term module as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as printing system 100, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

The computer system 100 can operate in a networked environment using logical connections to one or more remote computers (not shown). These logical connections are implemented using a communication device coupled to or integral with the computer system 100. The data sequence to be analyzed can reside on a remote computer in the networked environment. The remote computer can be another computer, a server, a router, a network PC, a client, or a peer device or other common network node. FIG. 1 depicts the logical connection as a network access 126 interfacing with the computer system 100 through a network interface 128. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Figure 2:
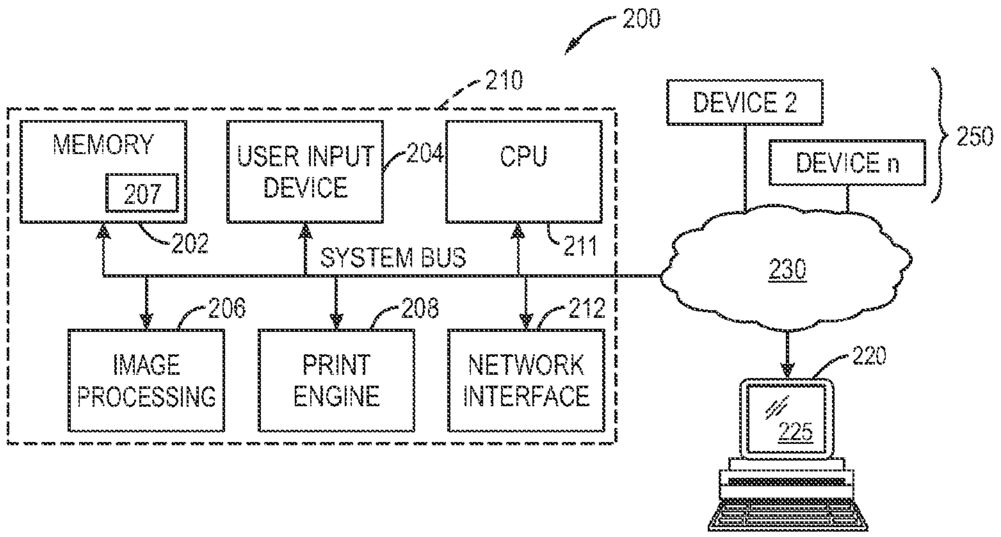
FIG. 2 illustrates a system diagram in accordance with carrying out features of the present invention.

FIG. 2 illustrates another network system diagram 200 provided as a networked system capable for carrying out features of the present invention. The system shown in FIG. 2 is adapted for carry out data transfer between at least one printing device 210 and a client workstation 220, which can take the form of a server for central retrieval and management of data in an enterprise such a large print shop with several printing devices 250, 210 in operation and under management. A typical printing device 210 (or 250) will include a user input 204, a CPU 211, image processing module 206, print engine 208 and memory 202, which can contain print optimization software modules 207 capable of carrying out features of the present invention. Network interface 212 enables the printer to communicate with a client workstation 220 via a data network 230. An optimization software module 207 enabling features of the present invention can be stored in and retrieved from memory 202. The optimization software module 207 is processed by CPU 211. Software operation in client workstation 220 enables information in the form of production print capacity data retrieved from printing device 210 to be displayed on display 225. The optimization software module 207 and CPU 211 are operable in combination to automatically track and manage the printing device's 210 current production capacity and use and determine optimal capacity. Software on the client workstation 220 can display data collectively or on a per printer basis and integrate a billing and cost display including current billing, optimal billing and operating cost for each printer, or for the entire fleet of printers managed by the enterprise.

Figure 3:
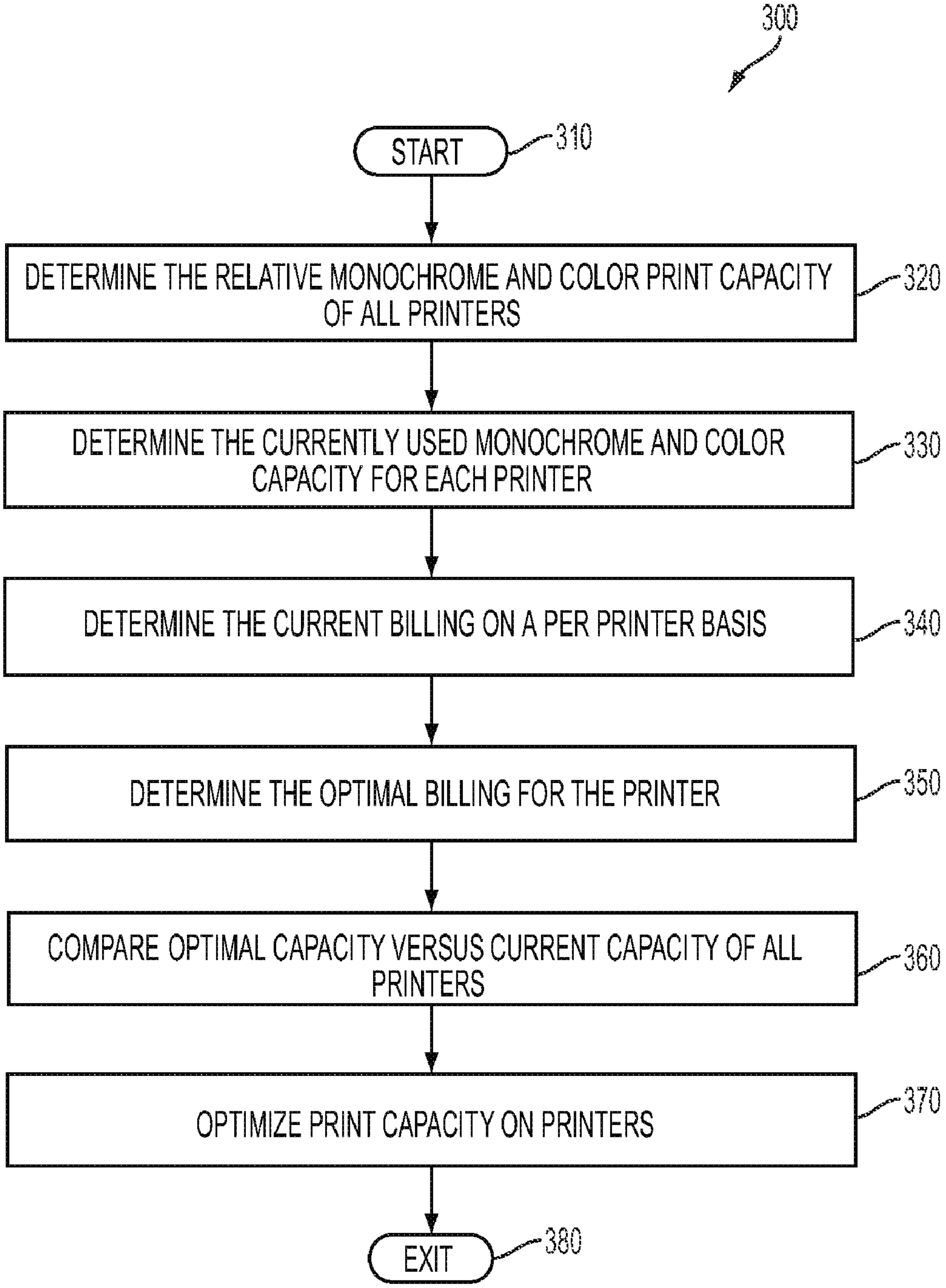
FIG. 3 illustrates a flow diagram of method steps in carrying out features of the present invention.

Referring to FIG. 3, a high level flow chart of operations depicting logical operational steps of providing production print capacity display for optimization process 300 is illustrated in accordance with the preferred embodiment. Note that the process or method 300 described in FIG. 3 can be implemented in the context of a software module such as process optimization software 107 of computer system 100 depicted in FIG. 1, and optimization software module 207 depicted in FIG. 2. The process depicted in FIG. 3 can be initiated, as indicated at block 310. The capacity checking software can be combined with user cost and pricing information and graphical and numerical displays that provide a print shop manager with the ability to determine the relative monochrome and/or color print capacity of printers both graphically and in percentage of total as depicted at block 320. Thereafter, the currently used monochrome and/or color capacity for at least one printer can be determined both graphically and in percentage of total as indicated at block 330. The current billing on a per printer basis and also the optimal billing for at least one printer can be determined as depicted at block 340. Next, the optimal billing for at least one printer is determined as depicted at block 350. The optimal capacity and current capacity of at least one printer are compared both on the basis of percent to capacity and cost of operation and billing rate as depicted at block 360. Thereafter, print capacity is optimized on printers based on number of prints or on the basis of billing rate to the end user on the basis of cost as depicted at block 370. The process can then terminate, as indicated at block 380.

It can be appreciated that a first, independent feature of the present invention include the automated collection and analysis of usage data for determining cost and optimal operation. Then the data, once analyzed by the system, can be displayed to a user or saved in memory (local or remote) for later retrieval and physical analysis by a user. The data can help users optimize printing operations at an enterprise, or for an individual printer.

Figure 4:
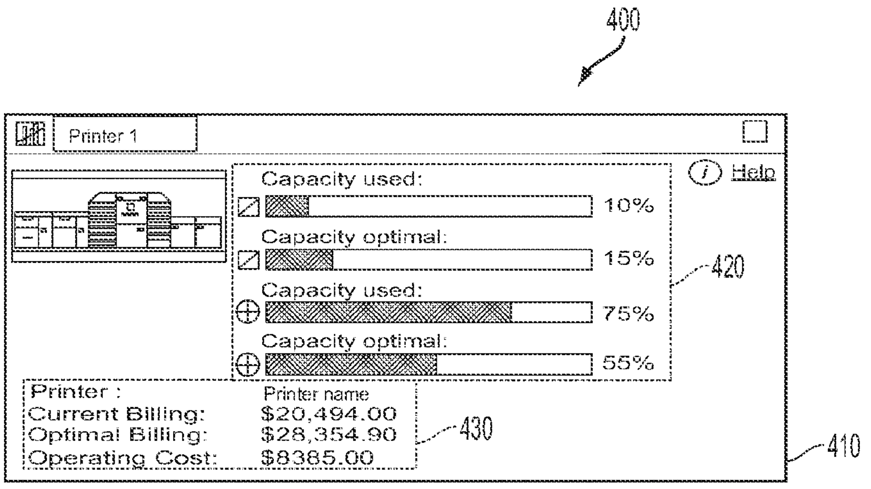
FIG. 4 illustrates an exemplary display of specifically organized combination of print capacity display, billing/cost display and visual container which can be implemented in accordance with a preferred embodiment.
Figure 5:
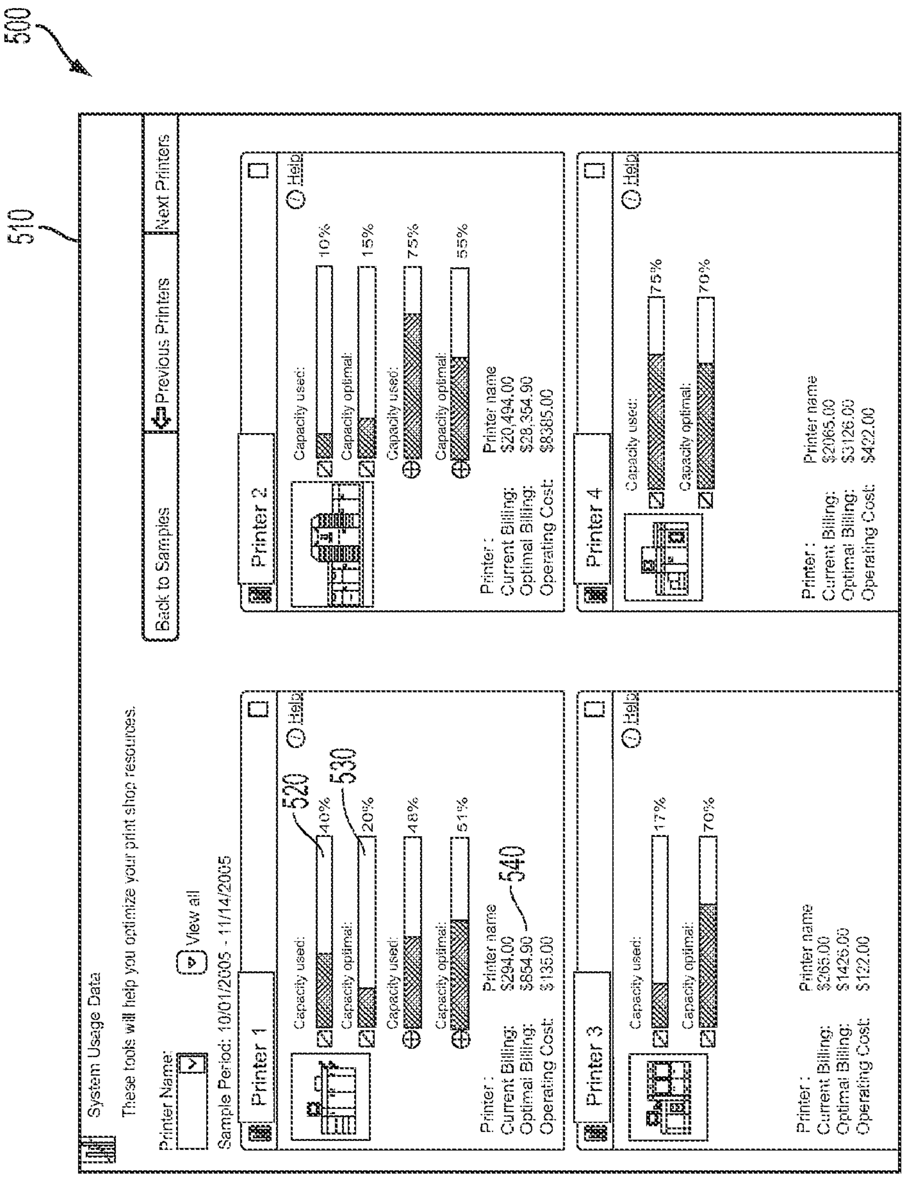
FIG. 5 illustrates an exemplary integrated display showing all the printers in a print shop in accordance with an alternative embodiment.

The following illustrations, FIG. 4 and FIG. 5, are provided as an exemplary display of how data that is automatically collected and analyzed by a system using process optimization software modules operating as a printing system 100 can be displayed to a user. FIGS. 4 and 5 are not meant to limit the scope of the present invention, but should serve as an example to the skilled in the art of how useful information provided via the present invention is.

FIG. 4 illustrates a display 400 that can be used in accordance with carrying out features of the present invention, wherein the display presents a specifically organized combination of data in the form of print capacity and billing/cost within a visual container 410. In the display that includes a visual container 410, the print capacity display 420 and billing/cost display 430 per printer are organized. The print capacity display 420 includes capacity used and optimal for monochrome, highlight color, and color pages. The billing/cost display 430 includes the current versus optimal billing. The combination of the three components, print capacity displays 420, billing/cost displays 430 and visual container 410 can be organized as shown in FIG. 4 to allow ease of comparison between optimal and actual conditions.

FIG. 5 illustrates an integrated display 500 in accordance with carrying out feature of the present invention, wherein all the printers belonging to an enterprise (e.g., a print shop) can be displayed. Similarly to information described with respect to the display in FIG. 4, all the printers independent data is integrated in a single display page 510. The optimization software module 207 shown in FIG. 2 and described with respect to FIG. 3, can derive values of the capacity displays 420 and billing/cost displays 430. The capacity used 520 can be derived by interrogating the print controller to determine the number of pages printed over a specified period of time as a percentage of total or target capacity for a device. The capacity optimal 530 can be defined as the number of pages that should be printed based on one or more optimization factors such as print speed, cost per page, and price charged to customer. The capacity optimal 530 can be derived based on a set of numerical assumptions or assertions by the customer and also the information derived from each printer about its capacity. For example, the capacity optimal 530 based on cost per page can be the capacity optimal 530 per printer based on cost and can be calculated as the maximum number of pages printed at the lowest cost. If differential costs are considered for monochrome and color pages, capacity optimal 530 suggests printing as many monochrome pages on a lower cost of monochrome printer as possible. The optimal billing 540 can be derived as a product of price per page and capacity optimal 530 in pages.

An alternate application of the present invention replaces the display with usage targets. The usage targets are based on quotas set by service contracts for service such as in XPF site support. The usefulness is to optimize the use of all printers for the purpose of proper distribution across devices and contact periods. For example, a contract might be setup to support a site with printing at a rate of 0.25 cents per impression up to 100,000 impressions per month for a given printer and 0.35 cents per impression beyond 100,000. In such case, the sites are enabled to stay on target by adjusting printer loading to maximize distribution across printers to possibly avoid overage rates by planning work across time periods.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of processing printer capacity utilization data, comprising:

a computer determining current capacity used for at least one printer;

said computer determining current billing and current operating cost based on said current capacity used of said at least one printer;

said computer determining monochrome and color print capacity available for the at least one printer;

said computer determining an optimal capacity based on a maximum number of pages printed on said at least one printer at a lowest cost, said monochrome and color print capacity available, optimal billing as a product of a price per page and said optimal capacity of said at least one printer, and optimal operating cost information based on said current operating cost information of said at least one printer to optimize current use of said at least one printer; and said computer graphically displaying a print capacity display and a billing/cost display in a visual container to compare between said optimal capacity and an actual capacity.

2. The method of claim 1 further comprising said computer providing said current capacity used, optimal capacity, current billing, optimal billing and operating cost information to a remote client for display on a single interface.

3. The method of claim 1 further comprising said computer providing said current capacity used, optimal capacity, current billing, optimal billing and operating cost information to a display associated with the at least one printer.

4. The method of claim 1 wherein said determining current capacity used and optimal capacity for the at least one printer further comprises the step of:

said computer determining current billing and optimal billing based on the monochrome and color print use and print capacity; and said computer comparing current billing versus optimal billing to determine operating cost for the at least one printer.

5. The method of claim 1 further comprising said computer retrieving said current capacity used information from the at least one printer by said computer interrogating a print controller associated with the at least one printer to determine the number of pages printed over a specified period of time as a percentage of total capacity for a device.

6. A method of processing printer capacity utilization data in an enterprise, comprising:

a computer determining current capacity used for printers in said enterprise;

said computer determining current billing and current operating cost information for said printers based on said current capacity used;

said computer determining monochrome and color print capacity available for the at least one printer;

said computer determining an optimal capacity based on a maximum number of pages printed on said at least one printer at a lowest cost, said monochrome and color print capacity available, optimal billing as a product of a price per page and said optimal capacity of said printers, and optimal operating cost information based on said current operating cost information of said printers to optimize current use of said printers; and said computer graphically displaying a print capacity display and a billing/cost display in a visual container to compare between said optimal capacity and an actual capacity.

7. The method of claim 6 further comprising said computer providing said current capacity used, optimal capacity, current billing, optimal billing and operating cost information to a remote client for display on a single interface.

8. The method of claim 6 wherein the step of determining current capacity used and optimal capacity for each printer in an enterprise further comprises:

said computer determining a value of used monochrome and color capacity for each printer; and said computer determining whether current billing and optimal billing is based on the monochrome and color print use and print capacity.

9. The method of claim 8 further comprising said computer comparing the current billing versus the optimal billing information to determine said operating for each printer.

10. The method of claim 6 further comprising said computer retrieving said current capacity used information from printers by said computer interrogating a print controller associated with each of the printers to determine the number of pages printed over a specified period of time as a percentage of total capacity for a device.

11. A computer-implemented system to optimize production print capacity, comprising:

a data-processing apparatus; and an optimization module executed by said data-processing apparatus, said optimization module and said data-processing apparatus operable in combination to:

indicate current capacity, current billing, optimal billing and current operating cost of said at least one printer;

graphically determining monochrome and color print capacity available for said at least one printer;

determine optimal capacity based on said current capacity of said at least one printer, optimal capacity based on a maximum number of pages printed on said at least one printer at a lowest cost, said monochrome and color print capacity available, optimal billing as a product of a price per page and said optimal capacity of said at least one printer, and optimal operating cost information based on said current operating cost information of said at least one printer to optimize current use of said at least one printer; and graphically display a print capacity display and a billing/cost display in a visual container to compare between said optimal capacity and an actual capacity.

12. The computer system of claim 11 wherein said current capacity and said optimal capacity is displayed in a graphical user interface.

13. The computer system of claim 11 wherein said current billing, optimal billing and operating cost is displayed in a graphical user interface.

14. The computer system of claim 11 wherein said current capacity, said optimal capacity, current billing, optimal billing and operating cost is displayed in a graphical user interface.

15. The system of claim 11 wherein said data-processing apparatus and said at least one module are further operable in combination with one another to:

determine relative monochrome and color print capacity of a plurality of printers on a percentage basis of said plurality of printers;

graphically evaluate a value of currently used monochrome and color capacity for said at least one printer;

evaluate a value of currently used monochrome and color capacity for said at least one printer on a percentage basis of said plurality of printers;

determine current billing on a per printer basis;

obtain optimal billing on a per printer basis;

compare said optimal capacity versus current capacity of said plurality of printers; and optimize print capacity of said at least one printers.

16. The system of claim 11 further comprising:

a print capacity display including said current capacity used and said optimal capacity for monochrome, highlight color, and color pages;

a billing and cost display including said current billing and optimal billing; and a visual container organizing said print capacity and said billing/cost displays per printer.

17. The system of claim 11 further comprising a graphical user interface to display current capacity and optimal capacity, current billing, optimal billing and operating cost information.

* * * * *